May 13, 1958 W. C. OBERLIN 2,834,156
CUTTING MACHINE
Filed Nov. 14, 1955 3 Sheets-Sheet 1

INVENTOR.
WILLIAM C. OBERLIN
BY
Oscar L. Spencer
ATTORNEY

May 13, 1958  W. C. OBERLIN  2,834,156
CUTTING MACHINE

Filed Nov. 14, 1955  3 Sheets-Sheet 2

INVENTOR.
WILLIAM C. OBERLIN
BY
Oscar L. Spencer
ATTORNEY

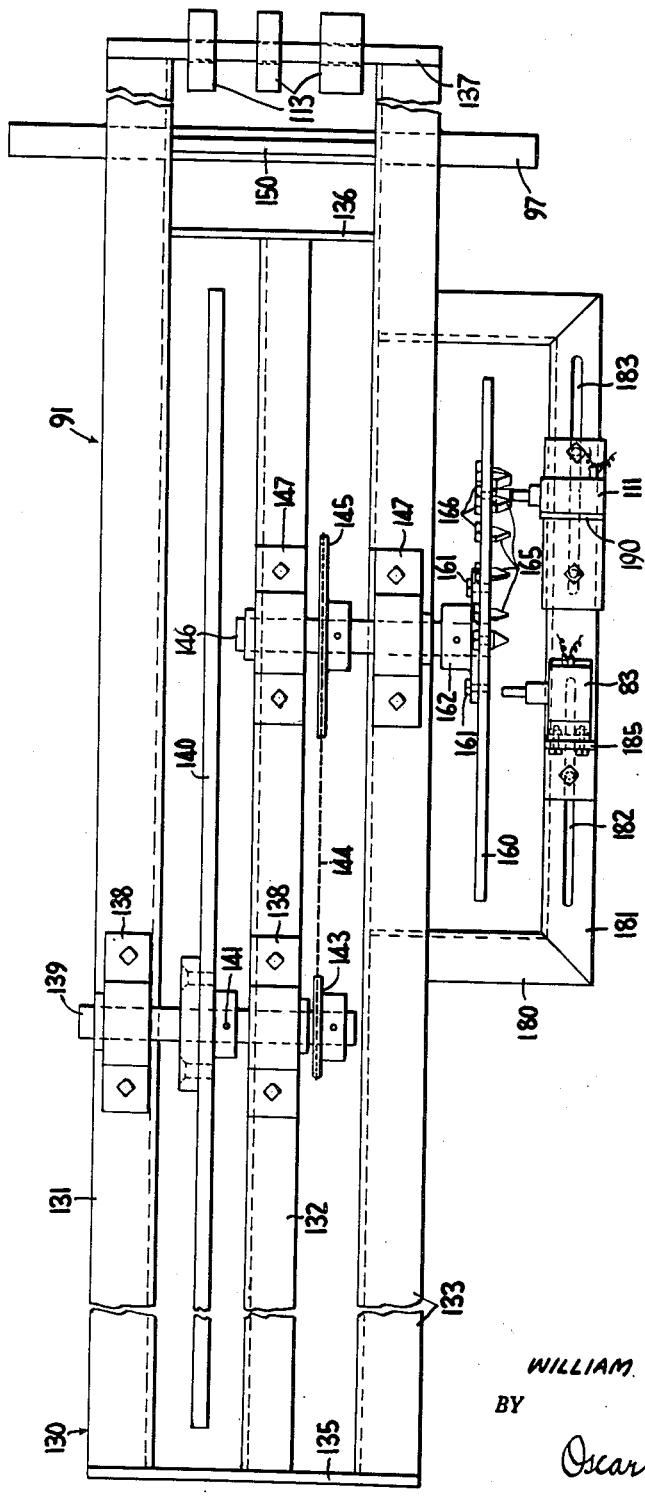

2,834,156
CUTTING MACHINE

William C. Oberlin, Crystal City, Mo., assignor to Pittsburgh Plate Glass Company, Allegheny County, Pa., a corporation of Pennsylvania Application November 14, 1955, Serial No. 546,665

7 Claims. (Cl. 49—48)

This invention relates to a cutting machine and more especially relates to a machine for cutting transversely a continuous ribbon of glass into sheets.

In the manufacture of plate glass on a continuous basis there is obtained a continuous ribbon of glass. The ribbon is obtained by flowing molten glass from a tank furnace so that the molten glass will pass between a pair of rotating forming rolls and then onto apron rolls which convey the viscous ribbon onto rolls of a conveyor. The conveyor moves the glass ribbon through an annealing lehr and then along an uncovered section of the conveyor where the glass ribbon is cooled to a temperature sufficiently low to permit cutting of the glass ribbon. In the conventional plant, the continuous ribbon is first scored along the edges for later removal of the uneven edges and to provide a ribbon of uniform width. After scoring of the ribbon near the edges, the continuous ribbon is cut tranversely to provide sheets of the desired length. The transverse cut is opened up to separate the glass sheet from the ribbon by the use of a snapping device at a point farther along the conveyor and then the edge cuts are opened up to remove the narrow strips containing the uneven edges.

The transverse cut and the edge cuts are made to provide sheets of rough-rolled glass that will be placed upon rail-mounted cars for the conventional grinding and polishing operation, first on one side of the glass sheets and then on the other side.

A number of cutting mechanisms have been developed for the transverse cutting of the continuous ribbon of glass. These cutting mechanisms are conventionally mounted that the cutter when making the transverse cut moves longitudinally, that is, in the direction of the movement of the continuous glass ribbon, while it is moving transversely to make the cut. The longitudinal movement is necessary to obtain what is known as a square cut, i. e., a cut at right angles to the cut edges of the continuous glass ribbon. In the absence of the longitudinal movement during the transverse movement the cut would provide what is known as a diagonal cut.

The conveyors used in the cutting zone as well as in the annealing lehr utilize rolls that are arranged in a horizontal plane and are driven by a motor utilizing sprockets on the end of each roll and a chain. The chain is driven by a sprocket on a gear reducer that is operated by the motor. The cutter is mounted on a carriage that has wheels at each end that ride on a pair of rails that are supported by the conveyor supporting frame and extend in the direction of movement of the glass ribbon. The carriage has a rail or bridge extending transversely to the movement of the glass ribbon. The cutter is mounted on a support that has wheels that run on this transverse rail. The conveyor frame supports a motor and two sets of sprockets, one set on each side of the conveyor. To move the carriage longitudinally the ends of the chains engaging the two sets of sprockets are connected conventionally by means of eye bolts to the cutter carriage. Also the carriage is provided with a motor, sprockets and a chain, the ends of the chain being connected by means of eye bolts to the cutter support mounted on the transverse rail so that the cutter support can be moved along the transverse rail to provide transverse movement of the cutter with respect to the path of movement of the glass ribbon.

In the apparatus heretofore used to actuate the cross-cutter mechanism to make the transverse cut of the continuous ribbon of glass, the actuation of the cross-cutter mechanism is conventionally made by tripping a limit switch with a cam wheel. The actuation of the limit switch energizes a time-delay relay that closes contacts to energize a magnetic clutch so that the conveyor will drive the sprockets that engage the chain connected to the carriage thereby moving the carriage in the direction of movement of the glass ribbon. At the same time the limit switch actuates the motor mounted on the carriage to drive the cutter support along the transverse rail. When the transverse cut is accomplished the relay opens the contact to deenergize the clutch and the carriage moves against another limit switch to similarly energize a second magnetic clutch to return the carriage to its starting position. The cam wheel is driven by a sprocket mounted on the shaft on which the cam wheel is mounted. A chain engages the sprocket and a sprocket mounted on one of the conveyor rolls. Thus the actuation of the limit switch by the cam wheel is determined by the speed of the conveyor.

In practice the glass ribbon does not always travel along the conveyor at a constant speed to provide a constant ratio of its speed of travel to the rate of rotation of the conveyor rolls. Sometimes the glass ribbon is moving at a faster rate than would be indicated by the rotation of the conveyor rolls and at other times the glass ribbon is moving at a slower rate. As a result, although the periods of time between the actuation of starting of the cross-cutter for cross cuts would be uniform, the lengths of the glass sheets obtained would not be uniform. In the cutting of the continuous ribbon of rough-rolled glass to provide sheets that were 143⅝" long it was found that the variation from this desired length was as much as plus ⅜" to minus ¼". Furthermore, in the modification of the conventional equipment by using a gear reducer between the drive provided by the conveyor roll and the cam wheel to provide a cross cut that would produce sheets that were 130" long, a total variation in length of about 1%.

In the cutting machine heretofore used, the length of the sheets obtained by the cross cut could be varied, but the machine was not capable of alternating between the cutting of a glass sheet of one length and then a glass sheet of a different length.

It is an object of the present invention to provide a cutting machine that will repetitively cut transversely a continuous ribbon of glass to provide sheets having a substantial uniformity of length.

It is another object of this invention to provide a cutting machine that will cross cut a continuous ribbon of glass to provide alternately sheets of glass of two different lengths, in which the sheets of each set of desired length have a high uniformity of length.

These and other objects of the present invention will be apparent to one skilled in the art from the following description of preferred embodiments of the invention taken in conjunction with the drawings in which:

Fig. 3 is a plan view of the actuating apparatus shown in Fig. 2.

Figure 1:
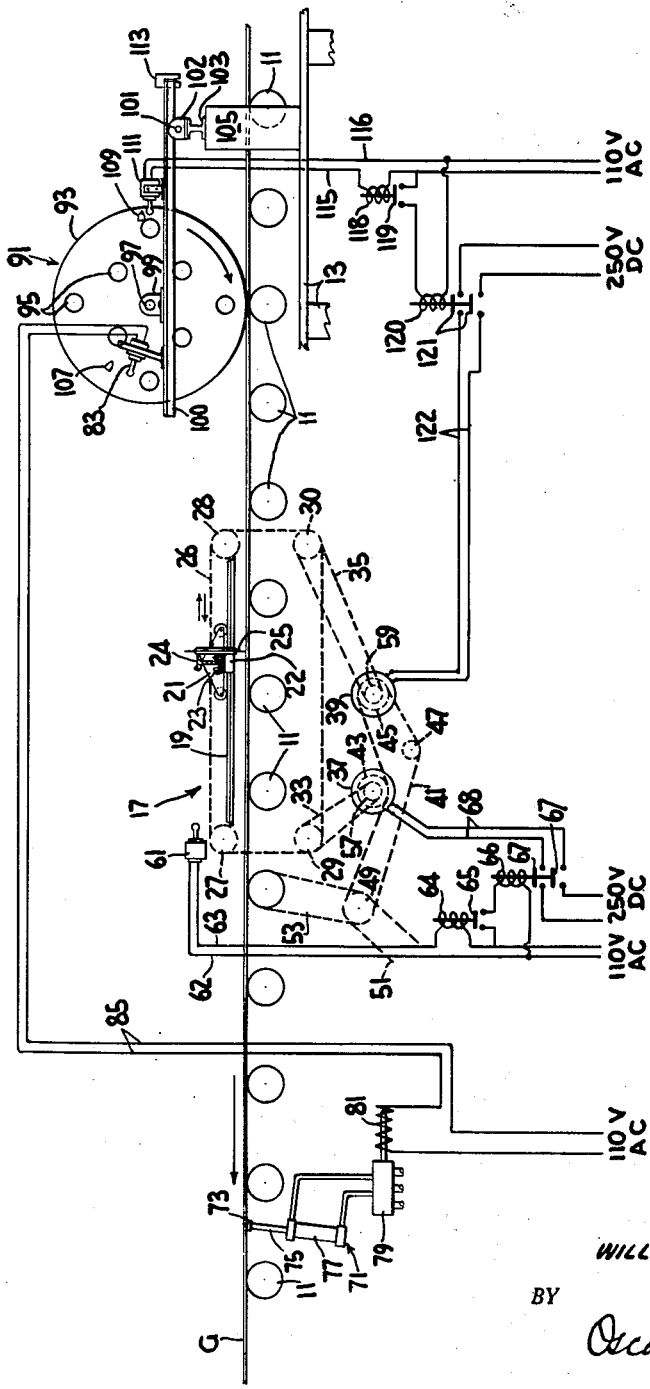
Fig. 1 is a front elevation, partially diagrammatic and partly in section, of a preferred embodiment of the cutting machine of the present invention showing the cross-cutter mechanism, the snapping device and the apparatus for actuating the cross-cutter mechanism and the snapping device.

As seen in Fig. 1, a continuous ribbon of glass G is moved from right to left by means of conveyor rolls 11. Each of rolls 11 is supported at each end by a pillow block (not shown) mounted on a supporting frame 13. Mounted on one end of each of rolls 11 is a sprocket (not shown). Each of the sprockets is driven by a chain that is connected to a gear reducer (not shown) that is driven by a motor (not shown).

A cross-cutter mechanism of the conventional type and generally indicated at 17 has a pair of rails 19 mounted by supports (not shown) on frame 13. One of the rails 19 is mounted on one side of frame 13 and the other rail 19 is mounted on the other side. The cross-cutter mechanism 17 has a carriage 21 with two pairs of wheels mounted on rails 19. A cutter support 22 has wheels 23 that ride on a transverse rail 24 of carriage 21 to move a glass cutter 25 mounted to support 22 across the glass ribbon G.

The cross-cutter mechanism 17 is also conventionally provided with a chain 26 connected at each end to carriage 21 and engaging sprockets 27, 28, 29 and 30 that are mounted on frame 13 by supports (not shown). The cutter support 22 is likewise movable on rail 24 because it is connected to the ends of a chain (not shown) that engages sprockets (not shown) mounted on carriage 21 and these sprockets are driven by a reversible motor (not shown) that is mounted on bridge 21. A sprocket 29 is keyed on a shaft in common with another sprocket (not shown) that is driven by chain 33. Likewise, a sprocket 30 is keyed on a shaft in common with a sprocket (not shown) that is driven by chain 35. Magnetic clutches 37 and 39 are mounted on conveyor supporting frame 13 by means of supports (not shown).

A chain 41 engages sprockets 43 and 45 mounted on the driving members of clutches 37 and 39, respectively. Chain 41 also engages an idler sprocket 47 and is driven by a sprocket 49 that is keyed on a shaft in common with a sprocket (not shown) that engages a chain 51 operated by the gear reducer (not shown) for operating conveyor rolls 11. A chain 53 engages a sprocket (not shown), keyed on the shaft on which sprocket 49 is keyed, to drive one of rolls 11 and thereby drive the other rolls 11 by a chain and sprocket arrangement (not shown).

A sprocket 57 is keyed on the driven end of magnetic clutch 37. When clutch 37 is energized, sprocket 29 is rotated by means of sprocket 57 and chain 33. Likewise, a sprocket 59 is keyed on the driven end of magnetic clutch 39. When clutch 39 is energized, sprocket 30 is rotated by means of sprocket 59 and chain 35. Chain 41 is mounted in engagement with sprockets 43 and 45 in a manner, as shown in Fig. 1, so that operation of chain 41 rotates sprocket 43 clockwise while chain 41 rotates sprocket 45 counterclockwise (as viewed in Fig. 1). Thus it is seen that when magnetic clutch 37 is energized, sprockets 27, 28, 29 and 30 are rotated clockwise, as viewed in Fig. 1, so that carriage is moved from left to right on rails 19. When clutch 39 is energized instead of clutch 37, the sprockets 27, 28, 29 and 30 are rotated counterclockwise, thereby moving chain 26 to move carriage 21 from right to left. Sprockets 27, 28, 29 and 30 are mounted on shafts at one side of the conveyor and similar sprockets are mounted on the other side and are engaged by another chain 26 that is connected at each end to carriage 21 so that both ends of the bridge are moved from left to right or right to left as viewed in Fig. 1 at the same speed.

A limit switch 61 is mounted on frame 13 by a support (not shown). When carriage 21 moves to the left-hand end of rails 19 by the energization of magnetic clutch 39, as described below, carriage 21 trips switch 61. The switch 61 is connected to a 110-volt alternating current source by means of wires 62 and 63. However, wire 63 is connected to the 110-volt A. C. source through a coil 64 of a time-delay relay that closes a normally-open contact 65 when coil 64 is energized by tripping limit switch 61. The relay maintains contact 65 closed for a predetermined period of time after deenergization of coil 64. The predetermined period of time is sufficient for carriage 21 to be moved from the left-hand end of rails 19 to the right-hand end because of the energization of clutch 37 as described below. A coil 66 of a relay closes a pair of normally-open contacts 67 when coil 66 is energized. Coil 66 is in series with contact 65 in a circuit connected to the 110-volt A. C. source. The contacts 67 are in the lines 68 connecting magnetic clutch 37 to a 250-volt D. C. source. Thus it is seen that the circuit described above results in energization of clutch 37 when limit switch 61 is tripped to momentarily close the circuit including coil 64. The energization of coil 64 closes contact 65 for the predetermined period of time. Closing contact 65 energizes coil 66 thereby closing the contacts 67 in the lines 68 providing electrical energy to energize clutch 37 until contact 65 is returned to its normally-open position by the time-delay relay containing coil 64.

A snapping device generally indicated at 71 is mounted to the supporting frame 13 between a pair of rolls 11. The device 71 is of the conventional type and is mounted on the conveyor at a point farther away from the annealing lehr than the cross-cutter mechanism 17 is mounted. As shown diagrammatically in Fig. 1 the horizontal bar 73 of device 71 is raised by rod 75 of air cylinder 77. Actuation of cylinder 77 raises bar 73 up against the moving sheet of glass G and the moment of engagement of glass G is chosen so that the cross cut in the glass and made by mechanism 17 is in alignment with bar 73 so that raising of bar 73 results in opening the cut produced by cutter 25. The raising and lowering of rod 75 by actuation of cylinder 77 is accomplished by means of a four-way valve 79 actuated by solenoid 81 in series with a limit switch 83 by means of wires 85 connected to a 110-volt A. C. source.

An apparatus for actuating the cross-cutter mechanism 17 and the snapping device 71 is generally indicated at 91. The apparatus 91 has a wheel 93 having holes 95 therein to reduce the weight. Wheel 93 is rigidly mounted on shaft 97 supported by a pair of pillow blocks 99 mounted on a yoke 100. The yoke 100 is pivotally mounted on frame 13 above rolls 11 by welding a cross plate (not shown) of yoke 100 to a shaft 101 which is mounted in pillow blocks 102. The blocks 102 are mounted on a transverse beam 103. Beam 103 is supported at the ends by support members 105 mounted on frame 13.

The wheel 93 has mounted on one of its faces a cam 107. The limit switch 83 is mounted on yoke 100 to be tripped by cam 107 once for each complete revolution of wheel 93. A cam 109 is also mounted on the same face of wheel 93 on which cam 107 is mounted, but cam 109 is mounted so that it will not trip switch 83 upon rotation of wheel 93. A limit switch 111 is mounted on yoke 100 so that it will be tripped by cam 109 each time wheel 93 makes a complete revolution but will not be tripped by cam 107. Yoke 100 extends beyond the pivotal mounting on shaft 101. Counterweights 113 are mounted on this extension to counter-balance most of the weight of the yoke 100 on the other side of shaft 101 and the parts mounted thereon, so that wheel 93 will press lightly against the continuous glass ribbon G and will be rotated by the movement of ribbon G without slippage and without sufficient pressure of wheel 93 on ribbon G to break the latter.

The limit switch 111 is connected to a 110-volt alternating current by means of wires 115 and 116. However, wire 115 is connected to the 110-volt A. C. source through a coil 118 of a time-delay relay that closes a normally-open contact 119 when coil 118 is energized by tripping limit switch 111. The relay maintains contact 119 closed for a predetermined period of time after de-energized of coil 118. The predetermined period of time is sufficient for carriage 21 to be moved from the right-hand end of rails 19 to the left-hand end because of the energization of clutch 39 as described below. A coil 120 of a relay closes a pair of normally-open contacts 121 when coil 120 is energized. Coil 120 is in series which contact 119 in a circuit connected to 110-volt A. C. source. The contacts 121 are in the lines 122 connecting magnetic clutch 39 to a 250-volt D. C. source. Thus it is seen that the circuit described above results in energization of clutch 39 when limit switch 111 is tripped to momentarily close the circuit, including coil 118. The energization of coil 118 closes contact 119 for the predetermined period of time. Closing contact 119 energizes coil 120, thereby closing contacts 121 in the lines 122 providing electrical energy to energize clutch 39 until contact 119 is returned to its normally-open position by the time-delay relay containing coil 118.

The circumference of wheel 93 equals the length of the sheet desired, so that cam 109 trips switch 111 for every complete revolution of wheel 93 and, of course, the complete revolution occurs when a length of ribbon G equal to the circumference of wheel 93 has moved under wheel 93 to provide the complete revolution. The position of cam 107 on wheel 93 relative to cam 109 is chosen so that cam 107 will trip switch 83 to actuate snapping device 71 at the moment that the cut last produced by the actuation of switch 111 by cam 109 is in alignment with bar 73. Of course, the positioning of cam 107 is dependent upon the distance between snapping device 71 and the point on the conveyor at which cross-cutter mechanism 17 begins the movement of cutter 25 across the glass ribbon G.

Figure 2:
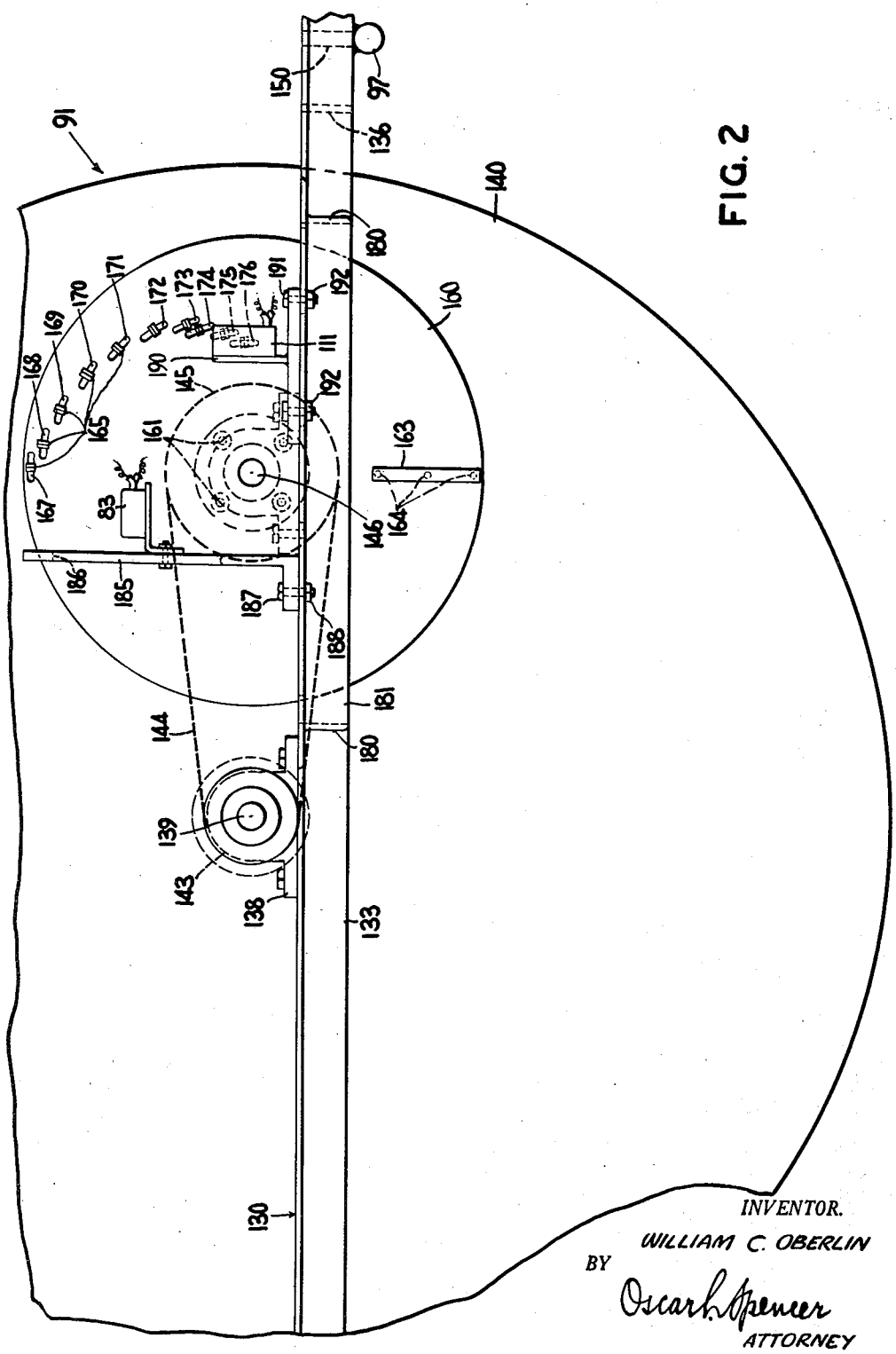
Fig. 2 is a fragmentary front elevation of a second preferred embodiment showing only another form of the apparatus for actuating the cross-cutter mechanism and the snapping device.

Referring now to Figs. 2 and 3, the second embodiment of the apparatus 91 for actuating cross-cutter mechanism 17 and snapping device 71 has a yoke generally indicated at 130 and comprising angle iron members 131, 132 and 133. The members 131, 132 and 133 are spaced apart by means of plates 135, 136 and 137 welded thereto. Pillow blocks 138 are mounted on angle iron members 131 and 132 and support shaft 139. A wheel 140 is mounted on shaft 139 by a set screw 141. A sprocket 143 is also fixed on shaft 139 at one end and is engaged by a chain 144 that engages a sprocket 145 fixed on a shaft 146 rotatively supported by pillow blocks 147 on angle iron members 132 and 133. Sprocket 145 has twice the number of teeth that sprocket 143 has to give a ratio of rotation of 1 to 2.

A plate 150 is welded between angle iron members 131 and 133 between shaft 139 and plate 137. The plate 150 is welded to shaft 97 that is mounted in pillow blocks 99 as described above in connection with Fig. 1. Thus yoke 130 is pivotally mounted about shaft 97.

The yoke 100 of the embodiment of Fig. 1 is pivotally mounted to shaft 97 in a manner similar to that described above in connection with yoke 130 but the construction can be otherwise considerably simplified because there is no requirement for the mounting of the shaft 146 and other parts in the embodiment of Figs. 2 and 3. Accordingly, the yoke 100 merely has a pair of angle iron members similar to members 130 and 133 that are spaced apart similar to the spacing of members 131 and 132 and plates 135 and 137 welded thereto are considerably shorter. Also in the construction of Fig. 1 for yoke 100 there is no need for plate 136.

Counterweights 113 are mounted on plate 137 to counteract most of the weight of the yoke and the other parts of the apparatus shown to the left of shaft 97 in Fig. 3. Wheel 140 as shown in Figs. 2 and 3 does not have holes similar to holes 95 but this features may be incorporated if it is desired to reduce the weight of wheel 140. Cams are not mounted on wheel 140 because of the cams mounted elsewhere as described below.

A circular plate 160 is fastened by screws to a flanged collar 162 rigidly mounted on shaft 146. An elongated cam member 163 is fastened to one side of circular plate 160 by bolts 164 through plate 160 and screwed into cam member 163. Cam member 163 extends radially on the plate face. Also mounted on plate 160 is a number of cam members 165 that have threaded shafts on which are mounted nuts 166. The cam members 165 are mounted on plate 160 by nuts 166 to present cam surfaces on the same side of plate 160 that cam member 163 is mounted. Their manner of mounting is adjustable along arcuate slots 167, 168, 169, 170, 171, 172, 173, 174, 175 and 176.

A pair of angle iron members 180 is welded to angle iron member 133 and the mitered ends of members 180 are welded to the mitered ends of an angle iron member 181. The member 181 has slots 182 and 183. The limit switch 83 is adjustably mounted in a vertical direction on a support bracket 185. The support is adjustable because of a vertical slot 186 in bracket 185. The bracket 185 is adjustably mounted on member 181 by means of bolt 187 through a slot 182 and nut 188 and thus may be moved horizontally along member 181 to position switch 83 to be tripped by cam member 163 or 165, so that snapping device 71 will be actuated at the proper moment as mentioned above in connection with Fig. 1. The limit switch 111 is mounted on support bracket 190 adjustably mounted on member 181 by bolts 191 through slot 183 and nuts 192.

The distances of the slots 167 through 176 from the axis of circular plate 160 are all different values so that for a given positioning of limit switches 83 and 111 cam member 163 and only one of cam members 165 will trip these switches by rotation of plate 160. The center of slot 167 is in alignment with or on the diameter containing elongated cam member 163. For the specific lengths of short and long glass sheets to be cut, as explained below, the other slots (168 through 176) are angularly displaced relative to said diameter.

When wheel 140 has a circumference of 143" and makes 2 complete revolutions by movement of 286" of glass ribbon thereunder, circular plate 160 makes one revolution because of sprocket ratio mentioned above. When the center of slots 168 through 176 are on radii to form angles therebetween and the radius through the center of slot 167 as tabulated below, the glass ribbon G will be cut alternately into sheets of glass having the lengths likewise tabulated.

| Slot | Angle* | Lengths of Alternate Sheets |
| --- | --- | --- |
| 168 | 6° 15'' | 138'' and 148'' |
| 169 | 16° | 156'' and 130'' |
| 170 | 29° | 166'' and 120'' |
| 171 | 41° | 176'' and 110'' |
| 172 | 54° | 186'' and 100'' |
| 173 | 65° | 195'' and 91'' |
| 174 | 69° | 198'' and 88'' |
| 175 | 78° | 205'' and 81'' |
| 176 | 87° | 212'' and 74'' |

*Angle between radius through center of slot 167 and radius through center of designated slot.

The variation in length is of the order of a few thousandths of an inch.

Switch 83 of Figs. 2 and 3 actuates snapping device 71 as in Fig. 1; also switch 111 energizes clutch 39 as in Fig. 1.

In both embodiments, tripping of switch 111 momentarily closes a contact to start the motor for moving support 22 across transverse rail 24. Energization of the motor closes a contact in a holding circuit so that the motor continues to run until support 22 trips a limit switch (not shown) mounted at the other side of the carriage to open a normally-closed contact in the holding circuit. This stops the motor. The cutter 25 and its support 22 remain on this side of the carriage until limit switch 111 is again tripped to close momentarily a contact for the circuit that will operate the motor in a reverse direction. As soon as the motor is thus operating a holding circuit continues the operation of the motor until the support 22 returns to the original side, at which time a normally-closed contact in the holding circuit for the reverse winding of the motor is opened by support 22 tripping a limit switch on the first or original side. Of course, other electrical circuits of the conventional types can be provided to accomplish the same movement of carriage 22 from one side to the other for one cross cut and then the return for the second cross cut by the next tripping of limit switch 111.

Although two sheets of glass totaling 286" in length are used in the rail-mounted cars for the grinding and polishing operation, the use of a long sheet and a short sheet to provide the total length is particularly advantageous from an economic standpoint in the latter cutting of the polished plate glass.

The foregoing description of the preferred embodiments has been presented with specific values, etc., merely for illustrative purposes. Also the invention is not limited to the cross cutting of plate glass. It is obviously applicable to the cross cutting of window glass in a continuous ribbon and of any other material in which a similar problem exists. Many modifications of the cutting machine will be apparent to one skilled in the art, e. g., the apparatus 91 can be used to actuate a cross-cutter mechanism that is well known in the art and is a type that rides on the glass and is moved by the moving ribbon during the cutting operation. Accordingly, the invention is not limited by the foregoing illustrative embodiments but only by the following claims.

I claim:

1. A cutting machine for cutting transversely a continuous ribbon of glass moving along a conveyor, which comprises a cutter, means for moving the cutter into engagement with and across the moving continuous ribbon, a snapping device mounted on the conveyor for opening the cut produced by said cutter, a yoke pivotally mounted on the conveyor above the moving continuous glass ribbon and about an axis transverse to the movement of glass ribbon, a wheel rotatively mounted on the yoke to ride on the moving continuous glass ribbon, a first cam means and a second cam means mounted on the wheel, cam-actuated means for actuating said cutter-moving means including a first limit switch mounted to be tripped by said first cam means, and cam-actuated means for actuating said snapping device including a second limit switch mounted to be tripped by said second cam means.

2. A cutting machine for cutting transversely a continuous ribbon of glass moving along a conveyor, which comprises a cutter, means for moving the cutter into engagement with and across the moving continuous glass ribbon, a snapping device mounted on the conveyor for opening the cut produced by said cutter, a yoke pivotally mounted on the conveyor above the moving continuous glass ribbon and about an axis transverse to the movement of the glass ribbon, a wheel rotatively mounted on the yoke to ride on the moving continuous glass ribbon, a plate rotatively mounted on the yoke, motion-transmitting means connected to the wheel and to the plate for rotating the plate with rotation of the wheel, a first cam means and a second cam means mounted on the plate, cam-actuated means for actuating said cutter-moving means including a first limit switch mounted to be tripped by said first and second cam means, and cam-actuated means for actuating said snapping device including a second limit switch mounted to be tripped by said first and second cam means.

3. A cutting machine for cutting transversely a continuous ribbon of glass moving along a conveyor alternately into glass sheets of two different lengths, which comprises a cutter, means for moving the cutter into engagement with and across the moving continuous glass ribbon, a snapping device mounted on the conveyor for opening the cut produced by said cutter, a yoke pivotally mounted on the conveyor above the moving continuous glass ribbon and about an axis transverse to the movement of the glass ribbon, a wheel rotatively mounted on the yoke to ride on the moving continuous glass ribbon, a plate rotatively mounted on the yoke, motion-transmitting means, including a chain and sprockets, connected to the wheel and to the plate for rotating the plate one complete revolution for every two complete revolutions of the wheel, a first cam means and a second cam means mounted on a face of the plate, said first and second cam means being on different radii that form an angle less than 180°, cam-actuated means for actuating said cutter-moving means including a limit switch mounted to be tripped by said first and second cam means, and cam-actuated means for actuating said snapping device including a second limit switch mounted to be tripped by said first and second cam means.

4. A cutting machine for cutting transversely a continuous ribbon of glass moving along a conveyor, which comprises a cutter, means for moving the cutter into engagement with and across the moving continuous ribbon, a snapping device mounted on the conveyor for opening the cut produced by said cutter, a yoke pivotally mounted on the conveyor above the moving continuous glass ribbon and about an axis transverse to the movement of glass ribbon, a wheel rotatively mounted on the yoke to ride on the moving continuous glass ribbon, cam means adapted to be moved in a cyclic path by rotation of said wheel, cam-actuated means for actuating said cutter-moving means mounted to be actuated by said cam means, and cam-actuated means for actuating said snapping device mounted to be actuated by said cam means.

5. A cutting machine for cutting transversely a continuous ribbon of glass moving along a conveyor, which comprises a cutter, means for moving the cutter into engagement with and across the moving continuous ribbon, a snapping device mounted on the conveyor for opening the cut produced by said cutter, a yoke pivotally mounted on the conveyor above the moving continuous glass ribbon and about an axis transverse to the movement of glass ribbon, a wheel rotatively mounted on the yoke to ride on the moving continuous glass ribbon, a first cam means and a second cam means each adapted to be moved in a cyclic path by rotation of said wheel, cam-actuated means for actuating said cutter-moving means including a first limit switch mounted to be tripped by said first cam means, and cam-actuated means for actuating said snapping device including a second limit switch mounted to be tripped by said second cam means.

6. A cutting machine for cutting transversely a continuous ribbon of glass moving along a conveyor, which comprises a cutter, means for moving the cutter into engagement with and across the moving continuous glass ribbon, a snapping device mounted on the conveyor for opening the cut produced by said cutter, a yoke pivotally mounted on the conveyor above the moving continuous glass ribbon and about an axis transverse to the movement of the glass ribbon, a wheel rotatively mounted on the yoke to ride on the moving continuous glass ribbon, a plate rotatively mounted on the yoke, motion-transmitting means connected to the wheel and to the plate for rotating the plate with rotation of the wheel, a cam means mounted on the plate, cam-actuated means for actuating said cutter-moving means including a first limit switch mounted to be tripped by said cam means, and cam-actuated means for actuating said snapping device including a second limit switch mounted to be tripped by said cam means.

7. A cutting machine for cutting transversely a continuous ribbon of glass moving along a conveyor alternatively into glass sheets of two different lengths, which comprises a cutter, means for moving the cutter into engagement with and across the moving continuous glass ribbon, a snapping device mounted on the conveyor for opening the cut produced by said cutter, a yoke pivotally mounted on the conveyor above the moving continuous glass ribbon and about an axis transverse to the movement of the glass ribbon, a wheel rotatively mounted on the yoke to ride on the moving continuous glass ribbon, a plate rotatively mounted on the yoke, motion-transmitting means, including a chain and sprockets, connected to the wheel and to the plate for rotating the plate one complete revolution for every two complete revolutions of the wheel, a first cam means and a second cam means mounted on a face of the plate, said first cam means including an elongated cam extending radially on the plate, said plate having a number of arcuate slots, the distance of each slot from the axis of rotation of the plate being different than the distance of any of the other slots and the radius passing through the center of each slot providing an angle with the radius passing through the first cam means mounted on the plate to provide an angle of less than 180°, the second cam means being mounted in one of said arcuate slots, cam-actuated means for actuating said cutter moving means including a first limit switch adjustably mounted to be tripped by said elongated cam and the second cam means, and cam-actuated means for actuating said snapping device including a second limit switch adjustably mounted to be tripped by said elongated cam and the second cam means.

References Cited in the file of this patent

UNITED STATES PATENTS

| | | |
|---|---|---|
| 1,453,856 | Rowley et al. | May 1, 1923 |
| 1,965,110 | Smith | July 3, 1934 |
| 2,058,663 | Brown | Oct. 27, 1936 |
| 2,177,607 | Brown et al. | Oct. 24, 1939 |
| 2,641,042 | Kopp | June 9, 1953 |
| 2,689,610 | Myers | Sept. 21, 1954 |

FOREIGN PATENTS

| | | |
|---|---|---|
| 690,606 | Great Britain | Apr. 22, 1953 |

UNITED STATES PATENT OFFICE
CERTIFICATE OF CORRECTION

Patent No. 2,834,156                                          May 13, 1958

William C. Oberlin

It is hereby certified that error appears in the printed specification of the above numbered patent requiring correction and that the said Letters Patent should read as corrected below.

In the drawings, Sheets 2 and 3, the numerical designation "97" of the shaft appearing at the right of Figures 2 and 3, each occurrence, should read -- 101 --; in the printed specification, column 2, line 47, after "long," insert -- there was --; column 5, line 14, for "which" read -- with -- lines 58, 60, 62 and 75, for "shaft 97", each occurrence, read -- shaft 101 -- same column 5, line 58, for "99" read -- 102 --; line 60, for "about" read -- by --; line 62, for "to", first occurrence, read -- by --; column 6, line 2, for "features" read -- feature --.

Signed and sealed this 21st day of October 1958.

(SEAL)

Attest:

KARL H. AXLINE                                               ROBERT C. WATSON

Attesting Officer                                         Commissioner of Patents